Feb. 24, 1942.  P. C. GARDINER  2,274,365
VOLTAGE REGULATOR
Filed March 8, 1940

Inventor:
Paul C. Gardiner,
by Harry E. Dunham
His Attorney.

Patented Feb. 24, 1942

2,274,365

UNITED STATES PATENT OFFICE 2,274,365

VOLTAGE REGULATOR

Paul C. Gardiner, Scotia, N. Y., assignor to General Electric Company, a corporation of New York Application March 8, 1940, Serial No. 322,920

12 Claims. (Cl. 171—312)

My invention relates to voltage regulators and more particularly to voltage regulators employing electric valves or electric discharge devices.

In the application of electric valve regulating circuits to the control of direct current load circuits, it is important that the regulating apparatus be capable of maintaining the load voltage within a narrowly defined range of values and at the same time afford an appreciable range of adjustment in the value of the voltage maintained at the load. In accordance with the teachings of my invention described hereinafter, I provide new and improved electric valve regulating circuits for direct current load circuits.

It is an object of my invention to provide new and improved electric valve regulating apparatus.

It is another object of my invention to provide new and improved electric valve translating apparatus which maintains the voltage of a direct current load circuit at a substantially constant value.

It is a further object of my invention to provide a new and improved electric valve regulating system for energizing a direct current load circuit from a direct current supply circuit, and which is capable of maintaining the voltage impressed across the load circuit at a constant value, and which permits a wide range of adjustment of the magnitude of the voltage impressed across the load circuit.

Briefly stated, in the illustrated embodiments of my invention I provide electric valve regulating apparatus for energizing a load circuit from a direct current supply circuit through a control electric discharge device of the high vacuum type. A second control electric discharge device controls the conductivity of the first discharge device. In order to increase the sensitivity of the control discharge device and also to obtain a considerable improvement in the range of adjustment of the magnitude of the voltage maintained across the load circuit, I provide a circuit including a constant current means for maintaining the cathode potential of the control discharge device at a substantially constant value.

Figure 1:
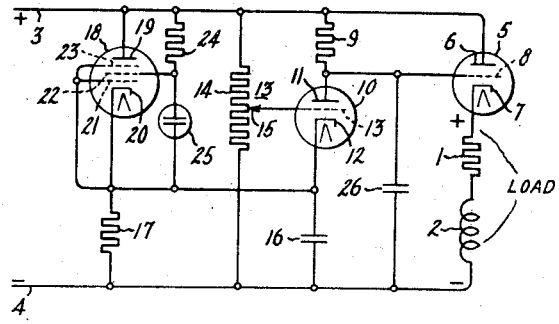
Figure 2:
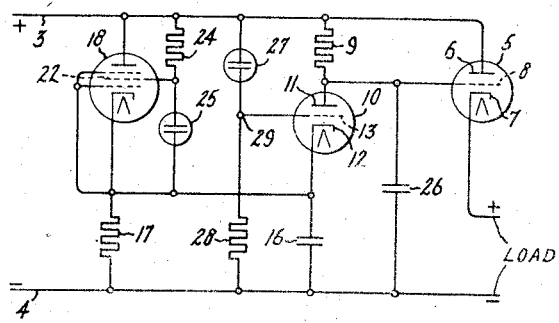
Figure 3:
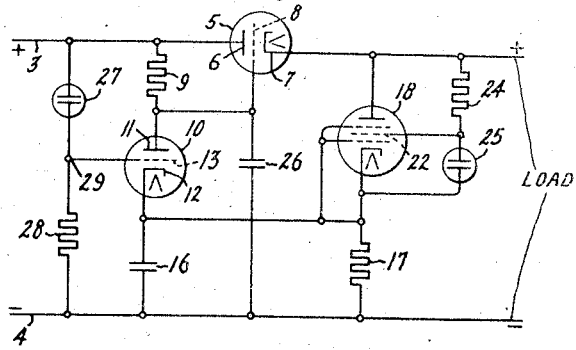

For a better understanding of my invention, reference may be had to the following description taken in connection with the accompanying drawing, and its scope will be pointed out in the appended claims. Figs. 1, 2 and 3 diagrammatically illustrate embodiments of my invention as applied to circuits for energizing a direct current load circuit from a direct current supply circuit.

Referring now to Fig. 1 of the accompanying drawing, I have represented my invention as applied to an electric valve regulator for energizing a load circuit, such as a direct current load circuit, which may be represented by a resistance 1 and an inductance 2. The system is energized from a source of direct current comprising a positive conductor 3 and a negative conductor 4. The direct current supply circuit may be energized, if desired, from the output circuit of the rectifier (not shown). An electrical condition such as the voltage of the load circuit is controlled by means of an electric discharge device 5 having an anode 6, a cathode 7 and a control grid 8. The electric discharge device 5 is preferably of the high vacuum type and serves as a variable impedance element connected between the supply circuit and the load circuit to impress a constant voltage across the load circuit.

To vary the potential of the grid 8 of discharge device 5, I provide a serially connected impedance element, such as a resistance 9, and a second or control electric discharge device 10, also preferably of the high vacuum type. The control discharge device 10 comprises an anode 11, a cathode 12 and a control grid 13. The anode 11 of the control discharge device 10 is connected to grid 8 of discharge device 5. The control discharge device 10 transmits variable amounts of unidirectional current through resistance 9 and, hence, controls the conductivity of discharge device 5.

As a means for varying the conductivity of the control discharge device 10 in response to the voltage of one of the associated principal circuits, such as the supply circuit, I provide a voltage divider 13 connected across the supply circuit and comprising a resistance 14 and an adjustable tap 15 which is connected to the grid 13 of discharge device 10. Adjustment of the tap 15 controls the component of supply voltage impressed on grid 13 and establishes the magnitude of the voltage maintained across the load circuit by the discharge device 5. I connect in series relation with resistance 9 and control discharge device 10 a capacitance 16. The capacitance 16 serves as an energy storage device to maintain the potential of the cathode 12 at a substantially constant value, thereby serving as a source of reference voltage.

To maintain the voltage across the terminals of capacitance 16 constant, I provide a constant current means energized from one of the associated principal circuits, such as the supply circuit, for transmitting a constant current through an impedance element, such as a resistance 17, which is connected across the terminals of capacitance 16. To transmit constant current through the resistance 17, I provide an electric discharge device 18, preferably of the high vacuum type, having an anode 19, a cathode 20, a control grid 21, a screen grid 22 and a suppressor grid 23. I provide a voltage divider including resistance 24 and a glow discharge device 25 connected between the cathode 20 and the positive conductor of the supply circuit to maintain the screen grid 22 at a constant potential above that of the cathode 20. The control grid 21 and the suppressor grid 23 are preferably connected to the cathode 20 so that there is substantially no potential difference between these control members and the cathode, and the conductivity of the discharge device 18 is determined by its applied anode-cathode voltage and the potential difference between the screen grid 22 and the cathode 20. The voltage divider, including resistance 24 and valve 25, serves to vary the conductivity of the discharge device 18 to maintain the current conducted thereby constant irrespective of variations in the magnitude of the voltage of the supply circuit.

Due to the fact that the capacitive reactance of the capacitance 16 connected in the input circuit of the control discharge device 10 is appreciable, and due to the effective resistance connected in the input circuit incident to a portion of resistance 14, it is possible to use filtering capacitances of smaller size or rating to absorb undesirable voltage ripples which would otherwise be impressed upon the control grid 8 of discharge device 5. A capacitance 26 of substantially smaller rating than that permissible in the prior art arrangements, due to the high impedance of the input circuit of the discharge device 10, is connected between the negative terminal of the load circuit and the grid 8 of discharge device 5.

The operation of the embodiment of my invention shown in Fig. 1 will be explained by considering the electric valve regulator when it is operating to maintain a constant voltage across the load circuit. The control discharge device 10 transmits variable amounts of unidirectional current through resistance 9 and resistance 17 to vary the potential of the grid 8. In this manner the effective impedance of the discharge device 5 is controlled to maintain the output voltage or the load voltage constant. The conductivity of the discharge device 10 is in turn controlled by means of the voltage divider 13 which is responsive to the supply voltage. Of course, since the output voltage is also proportional to the supply voltage, the supply voltage may be used as a reference voltage for the load voltage.

The potential of the cathode 12 is maintained at a substantially constant value above that of the negative conductor 4 of the supply circuit and of the load circuit. Electric discharge device 18 transmits a substantially constant current through the resistance 17 to maintain a constant voltage drop thereacross and thereby maintain cathode 12 at a constant potential. The voltage divider, including resistance 24 and glow discharge device 25, controls the conductivity of the discharge device 18 to maintain the current through the resistance 17 constant by maintaining a constant voltage difference between screen grid 22 and cathode 20. Furthermore, this voltage divider is also responsive to variation in current transmitted by the control discharge device 10 inasmuch as it is connected between the upper terminal of resistance 17 and the positive conductor 3. In other words, this voltage divider maintains a constant current through the resistance 17 irrespective of the small current variations through this element occasioned by the changes in conductivity of the control discharge device 10.

The operation of the electric valve regulator may be more fully explained by considering the system when the supply voltage rises. The conductivity of the control discharge device 10 increases, effecting a decrease in potential of the control grid 8 of discharge device 5 and thereby increasing the effective impedance of that device and reducing the load voltage to the desired value. During this change, the potential of cathode 12 has remained constant due to the fact that the discharge device 18 has transmitted a constant current through resistance 17. As the voltage of the supply circuit increases, the current transmitted through the voltage divider, including resistance 24 and glow discharge valve 25, also increases. This current, of course, must flow through the resistance 17 and has the effect of tending to raise the potential of the cathode 20. This effect offsets the tendency to increase the anode-cathode current due to the increase in anode-cathode voltage of the electric discharge device 18 when the supply voltage rises. The potential difference between the screen grid 22 and the cathode 20 causes the discharge device 18 to operate within that region of its characteristic which maintains the current through the resistance 17 constant under these conditions. The tendency to change the current through resistance 17 occasioned by changes in the conductivity of the control discharge device 10 also is compensated for by the discharge device 18 and the voltage divider including resistance 24 and glow discharge device 25. In this manner the cathode 12 of the control discharge device 10 is maintained at a constant potential, making it possible to utilize changes in supply voltage to control precisely the conductivity of that discharge device 5. It will be understood that the regulator also operates to maintain the voltage of the load circuit when the supply voltage decreases.

The magnitude of the voltage impressed across the load circuit may be adjusted or established by adjustment of the tap 15 of voltage divider 13. Inasmuch as the input circuit impedance of the control discharge device 10 is relatively large and since the potential of the cathode 12 is maintained at a substantial value above the negative conductor, the output voltage or load voltage may be adjusted throughout a range substantially greater than that afforded by the prior art arrangements. For example, I have found that the output or load voltage may be varied through a range extending from 100 volts to 350 volts.

Fig. 2 diagrammatically illustrates another embodiment of my invention which is similar in many respects to that shown in Fig. 1, and corresponding elements have been assigned like reference numerals. Instead of using a voltage divider comprising only a resistance, in the arrangement of Fig. 2 I provide a voltage divider comprising a serially connected glow discharge device 27 and a resistance 28, the common juncture 29 of which is connected to grid 13 of control electric discharge device 10. This latter feature is disclosed and claimed in my copending patent application, Serial No. 322,919, filed concurrently herewith and which is assigned to the assignee of the present application.

The embodiment of my invention shown in Fig. 2 operates in substantially the same way as that explained above in connection with Fig. 1. Variations in supply voltage cause variations of current transmitted through the resistance 28 and, hence, raise and lower the potential of grid 13 in response to these variations, thereby controlling the conductivity of discharge device 5 to maintain the load voltage constant.

Instead of connecting the constant current portion of the regulator across the supply circuit, in the embodiment of my invention shown in Fig. 3, the electric discharge device 18 is connected across the output or load circuit. Otherwise, the arrangement of Fig. 3 is similar to that of Fig. 2 and operates to maintain the output voltage of the load circuit constant.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In combination, a direct current supply circuit, a load circuit, an electric discharge device connected between said circuits for controlling the voltage of said load circuit and comprising a pair of principal electrodes and a control grid, means responsive to the voltage of one of the first mentioned circuits for impressing a variable control voltage on said grid and comprising in series relation an impedance element and a control electric discharge device having an anode, a cathode and a control grid, a voltage divider connected across said one circuit for impressing a predetermined component of voltage of said one circuit upon the second mentioned control grid to vary the current conducted by said control discharge device, a second impedance element, means comprising a controlled electric discharge device for transmitting a substantially constant current through said second impedance element, means for controlling the conductivity of the last mentioned electric discharge device in response to the voltage of said one circuit to maintain the current conducted by the last mentioned discharge device constant, and means interconnecting said second impedance element and said cathode to maintain the potential of said cathode at a substantially constant value.

2. In combination, a direct current supply circuit, a load circuit, an electric discharge device connected between said supply circuit and said load circuit for controlling the voltage of said load circuit and comprising a pair of principal electrodes and a control grid, means responsive to the voltage of one of the first mentioned circuits for impressing a variable control voltage on said grid and comprising in series relation an impedance element, a control electric discharge device and a capacitance, said control electric discharge device having an anode, a cathode and a control grid, means for controlling the conductivity of said control discharge device in response to the voltage of said one circuit to vary the current conducted by said discharge device, a second impedance element, and constant current means connected to one of the first mentioned circuits for transmitting a substantially constant current through the second impedance element to maintain the potential of said cathode at a substantially constant value and comprising a controlled electric discharge device connected in series relation with said second impedance and a voltage divider for controlling the conductivity of said last mentioned electric discharge device.

3. In combination, a direct current supply circuit, a load circuit, an electric discharge device comprising a pair of principal electrodes and a control grid connected between said supply circuit and said load circuit, means responsive to the voltage of one of the first mentioned circuits for impressing a variable control voltage on said control grid and comprising in series relation an impedance element, a control electric discharge device and a capacitance, said control electric discharge device having an anode, a cathode and a control grid, a voltage divider connected across said one circuit for impressing a predetermined component of voltage of said one circuit upon the second mentioned control grid to vary the current conducted by said control discharge device in accordance with the voltage of said one circuit, and means for maintaining the potential of said cathode at a substantially constant value comprising a circuit for transmitting a substantially constant current including an impedance element, a controlled electric discharge device for transmitting a constant current through the last mentioned impedance element and a voltage divider responsive to the voltage of said one circuit for controlling the current transmitted by the last mentioned electric discharge device.

4. In combination, a source of current, a load circuit, an electric discharge device comprising a pair of principal electrodes and a control grid connected between said source and said load circuit, means for impressing a variable control voltage on said control grid and comprising means connected across said source in series relation comprising an impedance element, a control electric discharge device and a capacitance, said control electric discharge device having an anode, a cathode and a control grid, a voltage divider connected across said source for impressing a predetermined component of voltage of said source upon the second mentioned control grid to control the current conducted by said control electric discharge device, and means for maintaining the potential of said cathode at a substantially constant value comprising a circuit connected across said source and including in series relation a constant current means and a resistance.

5. In combination, a source of current, a load circuit, an electric discharge device comprising a pair of principal electrodes and a control grid connected between said source and said load circuit, means for impressing a variable control voltage on said control grid and including means connected across said source in series relation comprising an impedance element, a control electric discharge device and a capacitance, said control electric discharge device having an anode, a cathode and a control grid, a voltage divider connected across said source for impressing a predetermined component of voltage of said source upon the second mentioned control grid to control the current conducted by said control electric discharge device, means for maintaining the potential of said cathode at a substantially constant value comprising a circuit for transmitting a substantially constant current and including in series relation a resistance and a second control electric discharge device, and a voltage divider connected across said source for controlling the conductivity of said second control electric discharge device.

6. In combination, a source of direct current, a load circuit, an electric discharge device having a pair of principal electrodes and a control grid connected between said source and said load circuit, means for impressing a variable control voltage upon said control grid and means connected across said source in series relation comprising an impedance element, a control electric discharge device and a capacitance, said control electric discharge device having an anode, a cathode and a control grid, a voltage divider connected across said source for impressing a predetermined component of voltage of said source upon the second mentioned control grid to control the current conducted by said control electric discharge device, means for maintaining the potential of said cathode at a constant value comprising a second control electric discharge device and a resistance connected across said source, said second control electric discharge device having an anode, a cathode and a grid, and means for energizing the last mentioned grid to control the conductivity of said second control discharge device to maintain the current transmitted through said resistance at a substantially constant value and comprising a voltage divider connected across the anode and cathode thereof, said voltage divider comprising in series relation a resistance and a glow discharge device, the common juncture of which is connected to said last mentioned grid.

7. In combination, a source of direct current supply circuit having positive and negative terminals, a load circuit, an electric discharge device having a pair of principal electrodes and a control grid and being connected between said circuits for controlling the voltage of said load circuit, means for varying the potential of said control grid in response to the voltage of said supply circuit comprising in series relation an impedance element, a controlled electric discharge device and a capacitance, said controlled discharge device having an anode, a cathode and a grid, a capacitance connected between said anode and the negative terminal of said supply circuit, a voltage divider connected across said supply circuit for impressing a predetermined component of voltage of said supply circuit upon the grid of said controlled discharge device, means for maintaining the potential of said cathode at a substantially constant value including a serially connected control electric discharge device and a resistance connected across said supply circuit, means for connecting the last mentioned circuit to said cathode, and means for controlling the conductivity of the last mentioned electric discharge device to maintain the current transmitted thereby substantially constant.

8. In combination, a direct current supply circuit having positive and negative terminals, a load circuit, an electric discharge device connected between said circuits for controlling the voltage of said load circuit and comprising a pair of principal electrodes and having a control grid, means for varying the potential of said control grid in response to the voltage of said load circuit comprising in series relation an impedance element, a controlled electric discharge device and a capacitance, said controlled discharge device having an anode, a cathode and a control grid, a voltage divider responsive to the voltage of said load circuit for varying the potential of said control grid to vary the current transmitted through said impedance element, means for maintaining the potential of said cathode substantially constant comprising a circuit connected across said load circuit and including in series relation a controlled electric discharge device and a resistance, means for connecting said last mentioned circuit and said cathode, and means for controlling the conductivity of the last mentioned discharge device to maintain the current transmitted through said resistance at a substantially constant value.

9. In combination, a direct current supply circuit, a direct current load circuit, an electric discharge device connected between said circuits for controlling the voltage of said load circuit and comprising a pair of principal electrodes and a control grid, means for varying the potential of said control grid in response to the voltage of one of the first mentioned circuits and comprising in series relation an impedance element, a controlled discharge device and a capacitance, said controlled discharge device having an anode, a cathode and a grid, a voltage divider connected across said one circuit and including a glow discharge device for varying the conductivity of said control discharge device, means for maintaining the potential of said cathode at a substantially constant value comprising a circuit including in series relation a controlled electric discharge device and a resistance, means for interconnecting said circuit and said cathode, and means for controlling the conductivity of the last mentioned discharge device to maintain the current through said resistance at a constant value.

10. In combination, a supply circuit, a load circuit, electric translating apparatus for controlling an electrical condition of said load circuit, means for producing a voltage for controlling said translating apparatus and comprising an electric discharge device having a pair of principal electrodes and a control grid, means controlling the potential between one of said principal electrodes and said control grid and comprising an electric discharge device of the type having an anode, a cathode, a control grid, a screen grid and a suppressor grid, means for connecting said control grid and said suppressor grid to said cathode, and means for controlling the conductivity of the second electric discharge device in response to an electrical condition derived from one of the first mentioned circuits including a voltage divider connected across said circuit and comprising a glow discharge device connected directly between said cathode and said screen grid.

11. In combination, an electric circuit, an impedance element, means for controlling the current through said impedance element and comprising an electric discharge device comprising an anode, a cathode, a control grid, a screen grid and a suppressor grid, and means for controlling the conductivity of said electric discharge device in response to an electrical condition of said electric circuit and comprising a voltage divider connected across said circuit and including a glow discharge device connected directly between said screen and said cathode for maintaining a constant potential difference between said screen grid and said cathode.

12. In combination, an electric circuit, an impedance element, means for maintaining a constant current through said impedance element including an electric discharge device having an anode, a cathode, a control grid, a screen grid and a suppressor grid, means for connecting said control grid and said suppressor grid to said cathode to maintain these elements at substantially the same potential as said cathode, and means for varying the conductivity of said discharge device in response to the voltage of said electric circuit comprising a voltage divider connected to said electric circuit and having a glow discharge valve connected directly between said cathode and said screen grid, a resistance connected between said screen grid and the positive terminal of said electric circuit and a second resistance connected between said cathode and the negative terminal of said electric circuit.

PAUL C. GARDINER.